United States Patent [19]

Petersen

[11] Patent Number: 5,430,718
[45] Date of Patent: Jul. 4, 1995

[54] GENERATING IDLE CODES IN SWITCHES

[75] Inventor: Lars-Göran Petersen, Tumba, Sweden

[73] Assignee: Telefonaktiebolaget LM Ericsson, Stockholm, Sweden

[21] Appl. No.: 73,667

[22] Filed: Jun. 8, 1993

[30] Foreign Application Priority Data

Jun. 17, 1992 [SE] Sweden ............................... 9201861

[51] Int. Cl.$^6$ .................................................. H04Q 11/08
[52] U.S. Cl. ................................... 370/58.1; 370/58.2; 370/66; 370/68
[58] Field of Search ............................... 370/58.1–58.3, 370/66, 67, 68, 60, 69, 59, 16, 60.1, 100.1, 108

[56] References Cited

U.S. PATENT DOCUMENTS

| 4,718,062 | 1/1988 | Andersen | 370/94.1 |
| 4,841,522 | 6/1989 | Yamazaki | 370/58.1 |
| 4,884,264 | 11/1989 | Servel et al. | 370/58.1 |
| 4,941,141 | 7/1990 | Hayano | 370/58.1 |

FOREIGN PATENT DOCUMENTS

| 0250160 | 12/1987 | European Pat. Off. |
| 0351386 | 1/1990 | European Pat. Off. |
| 0414950 | 3/1991 | European Pat. Off. |

WO91/07857 5/1991 WIPO .

*Primary Examiner*—Douglas W. Olms
*Assistant Examiner*—Ajit Patel
*Attorney, Agent, or Firm*—Burns, Doane, Swecker & Mathis

[57] ABSTRACT

A circuit switch connected between transmitting and receiving devices includes a switch memory including a number of memory positions for entering of received time slot data from the transmitting devices, a control memory including a number of memory positions for entering read-out addresses for the switch memory, an addressing path from the control memory to the switch memory for a read-out address in the latter, from which read-out of data shall be made towards a receiving device, and a control unit for entering the read-out addresses in the control memory and for receiving information from the devices related to the connect and disconnect of calls. The addressing path from the control memory has an alternative communication path towards the receiving devices, and each memory position in the control memory includes a specific position for an indicator bit containing information with respect to whether read-out of time slot data should be made from the switch memory or from the control memory.

9 Claims, 2 Drawing Sheets

GENERATING IDLE CODES IN SWITCHES

BACKGROUND

The present invention relates to a circuit switch connected between transmitting and receiving devices and in particular to a switch having
- a switch memory including a number of memory positions for entering of received time slots from said transmitting devices,
- a control memory including a number of memory positions for entering read-out addresses for said switch memory,
- an addressing path from said control memory to said switch memory for a read-out address in the latter, from which read-out of data shall be made towards a receiving device and
- a control unit for entering said read-out addresses in said control memory and for receiving information from said devices related to the connect and disconnect of calls.

In switches it is a problem to generate idle codes for disconnected calls. It is important to have a known idle code, e.g. for a processor connected to the switch. If the processor does not have any known idle code it implies in general that the processor cannot distinguish between valid through connected signals and garbage. Moreover it can imply problems to synchronise when a real signal once arrives.

Examples of idle codes are μLAG, aLAG, X25-FLAG, X25-RESET.

A usual method to solve the problem is to switch to a predefined homing position or not to take any action at all in the switch. In the latter case the receiver must use a code of its own as far as required. This will work well enough in the cases where telephone subscribers are connected or when a terminal connected to the switch can generate idle codes for e.g. trunks. In cases where switching is made to a predefined homing position a specific device is required for each requested idle code only for this service.

In U.S. Pat. No. 4,718,062 a telecommunication system is described in which circuit switched data and packet data are communicated. The transmitting device includes a first memory with channels corresponding to respective time slots. Each channel includes status information for indicating whether that channel is in a busy or idle status. Further there is a second memory.

A multiplexor sequentially scans the channels in the first memory within the respective time slots and is dependent on status information in each channel for recovering data from the first memory within a time slot when the status information indicates that a channel is busy and for recovering data from the second memory within a time slot when the status information indicates that the channel is idle.

In EP 250 160 a system is described where circuit switched data and packet data are inserted in different time slots. A memory has an individual position for each time slot. In the memory information is entered which specifies if the individual time slot should serve circuit switched data or packet data. A specific information bit is inserted in each time slot for specifying if the rest of the bits in the time slots should represent one or the other type of data.

None of the above publications is concerned with the generation of idle codes.

SUMMARY

The object of the invention is to simply and efficiently generate the idle code which each device connected to the switch requires in a disconnected position to enable the receiver of the device to distinguish between an established connection with signal communication and a disconnected connection.

This object is achieved in a switch of the kind indicated by way of introduction by
- said addressing path from said control memory having an alternative communication path towards said receiving devices, and
- each memory position in said control memory including a specific position for indicator bit means containing information with respect to whether readout of a time slot towards a receiving device should be made from said switch memory or from said control memory.

According to one embodiment of the invention a multiplexor is controlled by said indicator bit means for collecting time slots from said switch memory or said control memory.

The indicator bit is preferably entered via the control unit into each position in the control memory in a predefined position.

DETAILED DESCRIPTION

Preferably the indicator bit states that a time slot should be collected from the switch memory in a connected state and from the control memory in a disconnected state.

The control unit for this purpose may comprise means for entering into a portion of said control memory disposed for a time slot directed to a receiving device, a pattern requested by a device in a disconnected state.

The invention enables the generation of idle codes in a so called "Fast Circuit Switch". It is, however, also useable for all types of circuit connected switches.

DESCRIPTION OF THE FIGURES

The invention will now be described in some detail with reference to the enclosed drawings, on which

Figure 1:
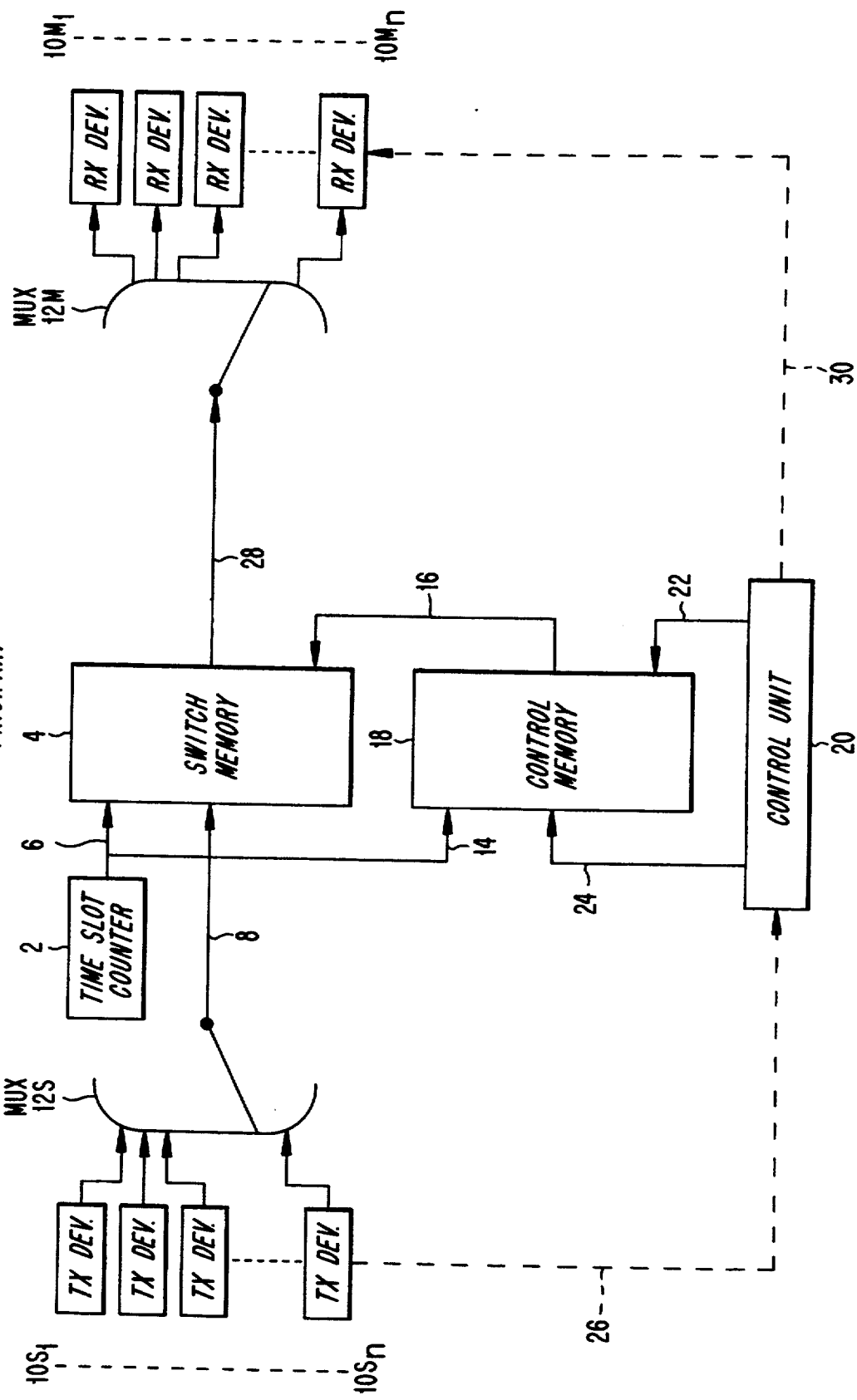
FIG. 1 is a schematical block diagram of a circuit coupled switch according to prior art.

The switch according to FIG. 1 comprises a time slot counter 2 which for each frame (125 μs) of time slots cyclically counts through all write addresses in a switch memory 4, at the arrow 6. For each write address entering of an incoming time slot is made in the switch memory 4, at the arrow 8, from connected transmitter devices $10S_1$–$10S_n$. The transmitter devices 10 S, which in the figure are shown symbolically, are multiplexed via a multiplexor 12S into the switch memory 4. Each device can have one or more time slots within the frame according to well known principles. All memory positions in the switch memory 4 are thus updated once per frame with information from connected transmitter devices 10.

The time slot counter 2 also controls, cyclically per frame, read addresses, at the arrow 14, for reading, according to arrow 16, a value in a control memory 18, which has earlier been entered from a control unit 20.

This implies that all memory positions in the control memory 18 will be read out once per frame. The number of positions in the switch memory 4 and the control memory 18 can each be 2560.

Entering of values into the control memory 18 is made from the control unit 20 via write addresses, at arrow 22, and entering data, at the arrow 24. FIG. 1 also schematically shows that there is a control path 26 from the devices, in this case from transmitting devices 10, to the control unit 20 for connect and disconnect.

The read-out memory position in the control memory 18 constitutes a read-out address 16 for the switch memory 4, which thus is read-out 2560 times per frame. As a principle only those positions in the switch memory 4, which are addressed by the read address 16 via the control memory 18 are read-out. This implies e.g. that a certain position in the switch memory 4 can be read out 2560 times for each frame or e.g. that all positions may be read out once per frame. By the control memory 18 controlling the read-out from the switch memory 4, a through connect of time slots can in this way be made where a specific time slot from a device is temporarily stored in the switch memory 4 and is read-out in another time slot, which is owned by another device.

The write address 6 to the switch memory 4 indirectly indicates a connected transmitting device $10S_1-10S_2$ and the read address 14 to the control memory 18 indirectly indicates a connected receiving device $10M_1-10M_2$.

Time slots read from the switch memory 4, at the arrow 28, are multiplexed via a multiplexor 12M, in a manner known per se, to the connected devices 10M.

A disadvantage with the principle described above is that there is always a through connected path through the switch memory 4 irrespective of the contents of the control memory 18, which can imply that uncontrolled connections can be established through the switch memory 4 e.g. at disconnect of a connection, or that the receiving devices via separate control paths 30 from the control unit 20 get an indication of actual status.

Figure 2:
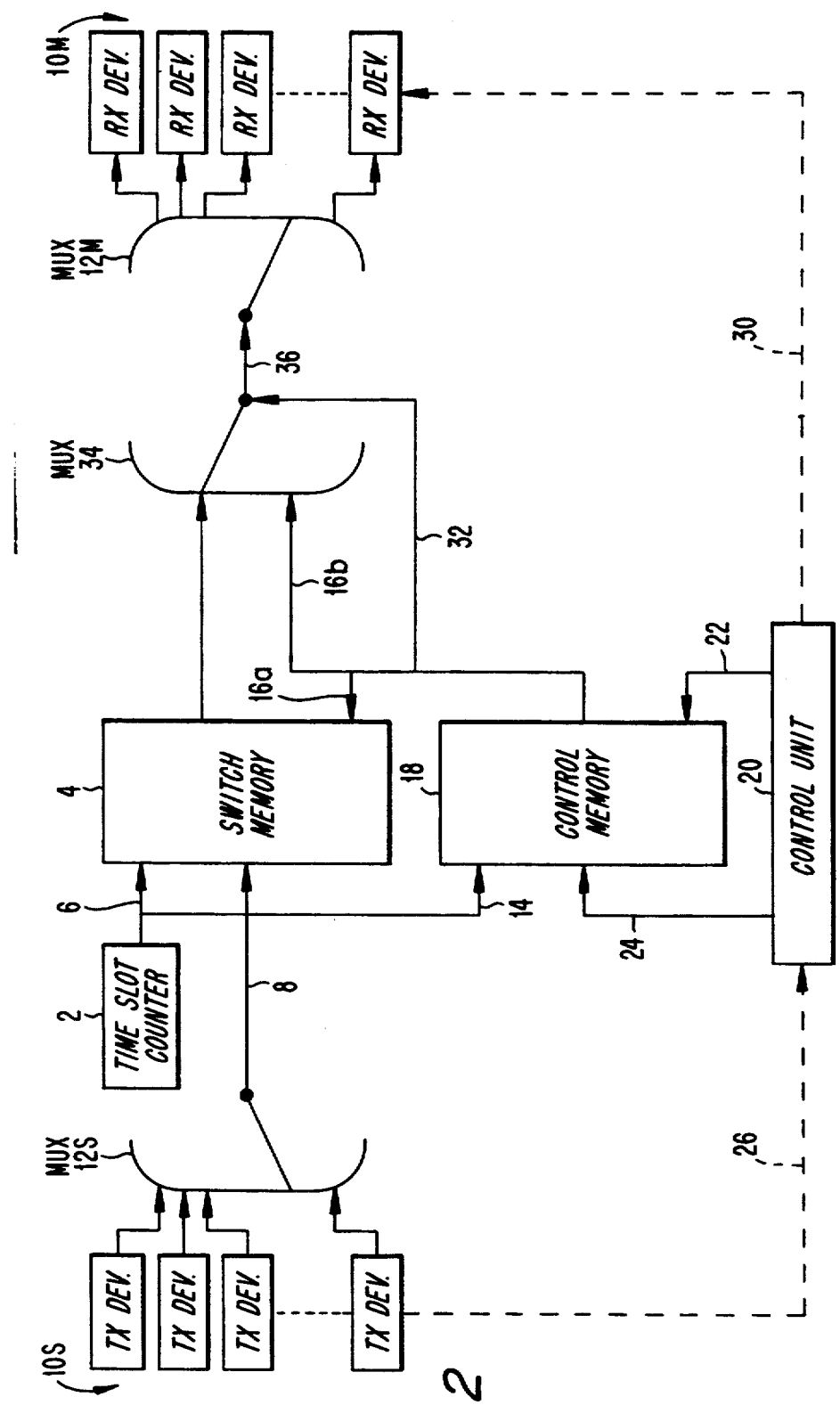
FIG. 2 is a schematical block diagram of a circuit coupled switch according to the invention and FIG. 3 shows the disposition of one position in the control memory.
Figure 3:
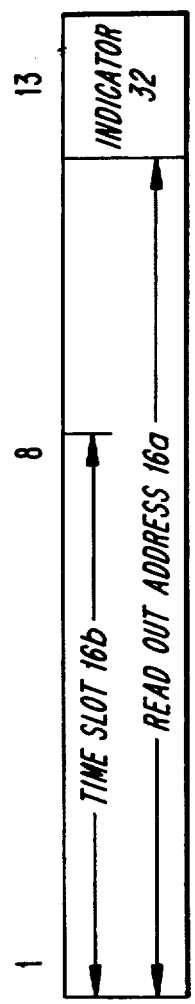

With reference to FIG. 2 and 3 the functional additions will now be described, which are suggested according to the invention to eliminate the above described disadvantage with a known circuit coupled switch, e.g. according to FIG. 1. Similar details as in FIG. 1 have in FIG. 2 been provided with the same reference numerals.

According to the invention an indicator bit 32 (FIG. 3) is added to each memory position in the control memory 18, said bit being used to control a multiplexor 34. The indicator bit 32 states if the multiplexor 34 should collect the read-out time slot from the switch memory 4 or from the control memory 18. If the indicator bit 32 states that a time slot 16b should be collected from the control memory 18 this implies that the read-out address 16a to the switch memory 4 does not include valid data. If the indicator bit 32 states that the time slot 28 should be collected from the switch memory 4 this implies that the read-out address 16a includes a valid address. A time slot 36 communicated through the multiplexor 34 is multiplexed via the multiplexor 12M in a way known, per se, to the connected devices 10M.

According to technique known, per se, the control unit 20, which writes the contents in the control memory 18, can put in a pattern, that the receiving device 10M is expecting in a disconnected state, and set the indicator bit 32 into a state which results in the part 16b of the memory position in the control memory 18 being transmitted to the device as a time slot. By this the disadvantage residing in the need to inform of the state change "disconnected" via the control path 30 to the devices 10M, which here may symbolise the control paths of all receiving devices, is eliminated. The disadvantage of the receiving devices 10M having to decide by themselves if the connection is disconnected by interpreting random data, is also eliminated.

What is claimed is:

1. A circuit switch connected between transmitting and receiving devices comprising:

a switch memory including a number of memory positions for storing time slot data received from the transmitting devices;

a control memory including memory positions for storing read-out addresses for the switch memory and memory positions for storing time slot data;

an addressing path from the control memory to the switch memory for a read-out address in the switch memory, wherein the received time slot data stored in the switch memory in the memory position corresponding to the read-out address can be retrieved and provided to a receiving device; and a control unit for entering the read-out addresses and time slot data in the control memory and for receiving information from the transmitting devices and for providing information to the receiving devices, wherein the information is related to connected and disconnected states of calls;

wherein the addressing path has an alternative communication path towards the receiving devices for time slot data stored in the control memory, and memory positions in the control memory each include a predetermined position for an indicator bit containing information for selecting retrieval of received time slot data from the switch memory or of time slot data from the control memory.

2. A switch according to claim 1, wherein the addressing path includes a multiplexer controlled according to an indicator bit of a memory position in the control memory.

3. A switch according to claim 1, wherein the control unit includes means for writing an indicator bit into a memory position in the control memory.

4. A switch according to claim 1, wherein each indicator bit contains information for retrieving received time slot data from the switch memory for calls in a connected state and time slot data from the control memory for calls in a disconnected state.

5. A switch according to claim 4, wherein the control unit includes means for storing in the control memory as time slot data a pattern expected by one of the receiving devices when a call related to that receiving device is in a disconnected state.

6. In a circuit switch connected between data transmitting and data receiving devices, a method of providing data to the receiving devices comprising the steps of:

storing first time slot data received from the transmitting devices;

receiving information from the transmitting devices and providing information to the receiving devices, wherein the information is related to connected and disconnected states of calls;

generating and storing second time slot data based on received information from the transmitting devices related to connected and disconnected states of calls;

retrieving the second time slot data and selectively retrieving the first time slot data based on the retrieved second time slot data that indicates one of a connected state and a disconnected state; and selectively providing the retrieved first time slot data and second time slot data to the receiving devices based on the retrieved second time slot data.

7. The method of claim 6, wherein the other time slot data includes indicator bits and either the stored received time slot data or the other time slot data is provided to the receiving devices based on the indicator bits.

8. The method of claim 6, wherein the indicator bits contain information whereby received time slot data is provided for calls in a connected state and other time slot data is provided for calls in a disconnected state.

9. The method of claim 8, wherein the other time slot data includes a pattern expected by a receiving device when a call related to that receiving device is in a disconnected state.

* * * * *